Figure 1:
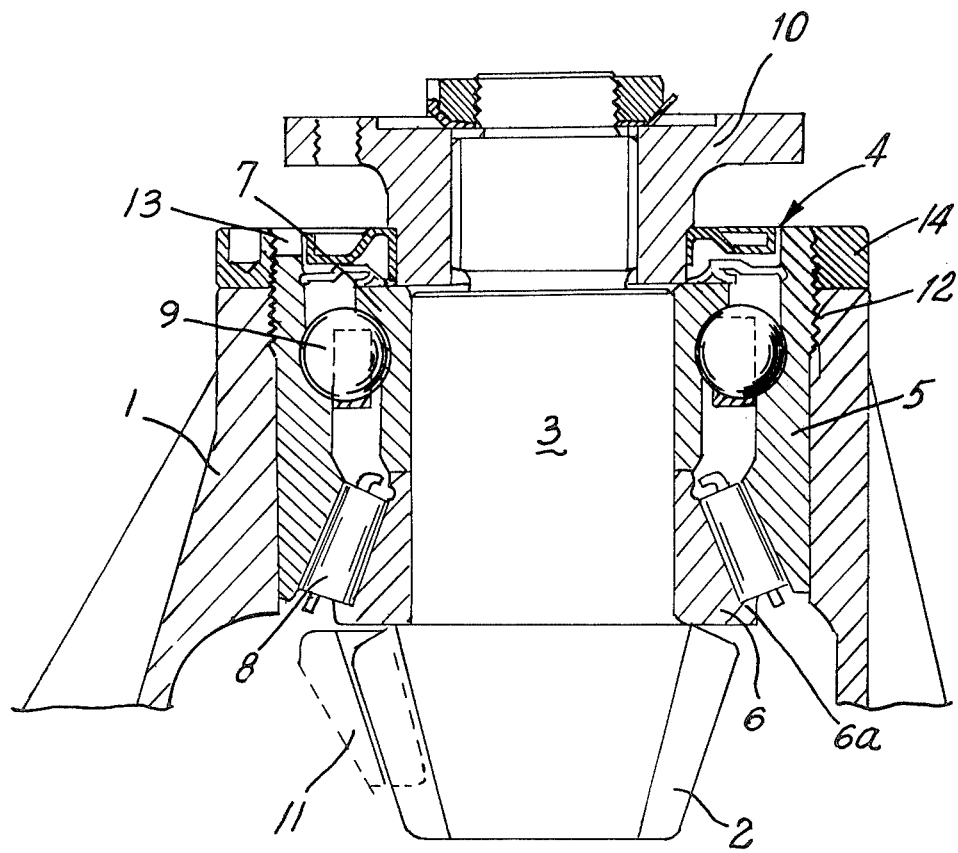

United States Patent [19]

Åsberg

[11] 4,248,487

[45] Feb. 3, 1981

[54] ROLLING BEARING

[75] Inventor: Sture L. Åsberg, Partille, Sweden

[73] Assignee: SKF Nova AB, Gothenburg, Sweden

[21] Appl. No.: 15,191

[22] Filed: Feb. 26, 1979

Related U.S. Application Data

[63] Continuation of Ser. No. 850,909, Nov. 14, 1977, abandoned.

[30] Foreign Application Priority Data

Dec. 1, 1976 [SE] Sweden ................................. 7613436
May 17, 1977 [SE] Sweden ................................. 7705758

[51] Int. Cl.$^3$ ........................ F16C 19/49; F16C 23/06
[52] U.S. Cl. ............................. 308/189 R; 308/207 R; 308/236
[58] Field of Search ............ 308/177, 178, 183, 189 R, 308/189 A, 196, 207 R, 207 A, 211, 214, 236

[56] References Cited

U.S. PATENT DOCUMENTS

| | | | |
|---|---|---|---|
| 1,099,571 | 6/1914 | Rennerfelt | 308/211 |
| 1,476,329 | 12/1923 | Duesenberg | 308/189 A |
| 1,503,849 | 8/1924 | Proctor | 308/207 A |
| 1,511,905 | 10/1924 | Oldham | 308/211 |
| 2,010,965 | 8/1935 | Scrivener | 308/189 R |
| 2,037,982 | 4/1936 | Hughes | 308/236 |
| 2,438,542 | 3/1948 | Cushman | 308/196 |
| 2,551,503 | 5/1951 | Needham | 308/236 |
| 2,692,805 | 10/1954 | Maxwell | 308/189 R |
| 4,150,468 | 4/1979 | Harbottle | 308/236 |

*Primary Examiner*—Richard R. Stearns
*Attorney, Agent, or Firm*—Eugene E. Renz, Jr.

[57] ABSTRACT

The combination comprising a housing, a shaft journal having a gear wheel at one end, and a bearing assembly rotatably supporting the shaft journal in a cylindrical seat in the housing. The assembly includes a one-piece outer ring having threads on its outer periphery cooperating with threads in the cylindrical seat. The outer ring is rotatable to permit axial adjusting movement of the bearing assembly relative to the housing. The bearing includes two rows of rolling bodies in the annular space between the rings spaced closely relative to one another and an inner race ring on the shaft journal for each of the rows of rolling bodies. One of the rows comprises rollers having axes inclined at an angle to the bearing axis disposed adjacent the gear wheel and the other row of rolling bodies comprises balls which roll against raceways in the ring to provide angular contact disposed at the opposite end of the shaft journal. A locking member engages the threads of the outer ring to permit axial adjustment thereof relative to the housing and abutts the housing to lock the outer ring in a predetermined axial position in the housing.

1 Claim, 2 Drawing Figures

ROLLING BEARING

This is a continuation of application Ser. No. 850,909, abandoned, filed Nov. 14, 1977.

The present invention refers to a rolling bearing comprising outer race ring, inner race ring and two rows of rolling bodies. The invention relates, in a specific embodiment, to a bearing arrangement for a pinion including such a rolling bearing.

The bearing according to the invention is primarily intended to be used in precision bearing arrangements, which can carry bending moments, where comparatively large loads will occur and where large demands are put on the ability of the bearing arrangement to withstand deformations. An example of such a bearing arrangement is the supporting of the pinion in an output gear of a motorcar, where the gear pinion during power transmission is subjected to heavy axial and radial loads, whereby it is essential for maintaining a correct mesh of teeth that the position of the gear is retained, i.e. that the bearing and the pinion are deformed and exposed to position changes as little as possible.

It is earlier known to use two-row angular contact ball bearings in pinion bearing arrangements. Such bearings can take up only small bending moment loads, whereby their field of use will be very limited. In most cases two separate taper roller bearings are therefore used. These bearings suffer from the drawback that they, because of their small contact angles, will need a long axial interspace in order to get the required ability of taking up moments. This will in turn bring about that the comparatively long shaft journal will be subjected to bending and also to thermal expansion which will influence the mesh of teeth for the pinion. Particular arrangements are needed to produce a pre-stressing of the bearings and for effecting a good lubrication of the outer bearing (oil channels for supply and discharge of oil). The two flanges which slidingly contact against the rollers will during the running-in period of the gear furthermore be heavily worn down by impurities in the oil, sometimes to such an extent that the biasing effect is lost.

The purpose of the present invention is primarily to provide a rolling bearing, which can take up heavy loads axially as well as radially, particularly with ability to take up large uni-lateral bending moments from a shaft supported in the bearing and which has smaller dimensions than earlier known bearing systems for corresponding purposes. This is according to the invention brought about thereby that the bearing is given the features defined in the appended claims. The outer taper roller bearing cannot be used in a conventional pinion bearing to the full extent of its service life. According to one aspect of the invention a pinion bearing therefore includes a two-row rolling bearing, where the outer row of rolling bodies consists of balls arranged with angular contact against the race tracks. As it is possible to use a much larger contact angle with balls than with taper rollers, it is possible, with an unsignificant diameter increase, to move the rolling body rows closer together in a double-row bearing, which has the same ability of taking up moments as two taper roller bearings.

Further advantages with a two-row bearing as compared to two taper roller bearings are i.e. the following:
built in pre-stressing in the bearing,
simple assembly,
shorter shaft journal, which is less sensitive to bending and thermal expansion, can be used for taking up bending moments,
the short distance between the ball row and the roller row and the lower requirements for a good lubrication for the balls makes it possible to eliminate oil channels to the ball row,
the pre-stressing is better maintained as only one flange is subjected to wear during running-in.

Figure 2:
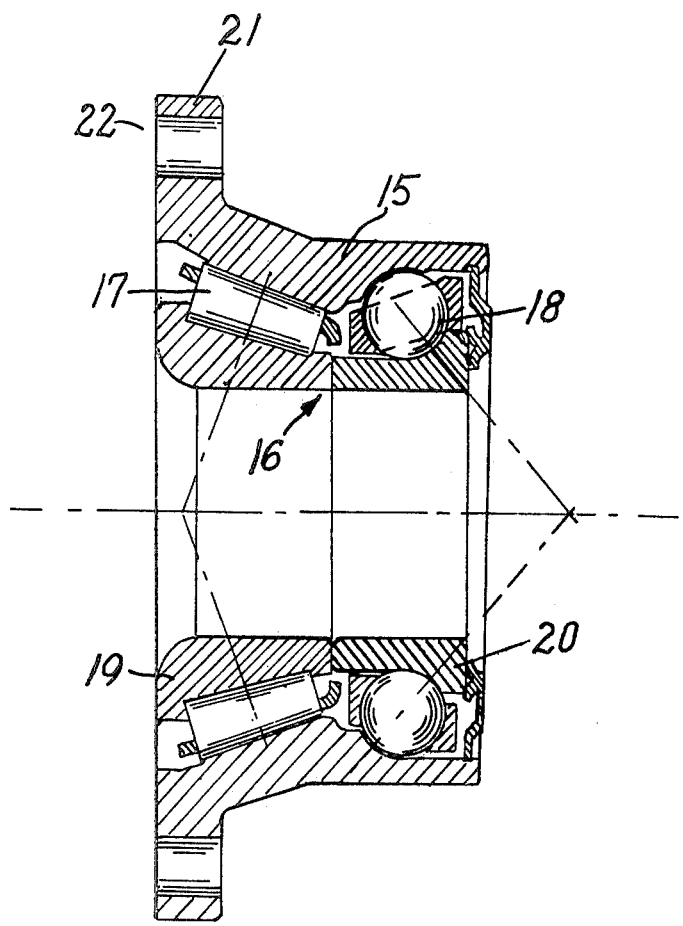

The invention will hereinafter be further described with reference to the accompanying drawing, of which FIG. 1 shows a longitudinal section through a bearing according to one embodiment of the invention in the form of a pinion bearing, and FIG. 2 shows a longitudinal section through a bearing according to another embodiment of the invention.

In a housing 1 are supported a pinion with a gear wheel 2 and a shaft journal 3 in a bearing 4. The bearing includes an outer ring 5, a divided inner ring 6, 7, a row of taper rollers 8, which roll against taper race tracks in the ring 5 and the ring 6 and engage a guiding flange 6a on this latter ring, and a row of balls 9, which roll against race tracks arranged in the ring 5 and the ring 7, which tracks give angular contact to the balls. The bearing is thereby arranged in such a manner that it can be tightened by suitable choice of the dimensions of the rings 6, 7 which are clamped between a radial shoulder at the gear wheel 2 and a nut 10. Axial load in one direction is taken up over the row of rollers, whereas axial load in the opposite direction is taken up over the row of balls. The row of taper rollers is arranged nearest to the gear wheel 2 as the load is highest at the row of rolling bodies located nearest to the gear wheel 2, which cooperates with another gear wheel 11, of which only a portion is shown for the sake of simplicity. Rollers have a better ability of absorbing load than balls. A further advantage in having the row of a rollers nearest to the gear wheel is that the supply of lubricant from the interior of the housing 1 to the rollers can be brought about safely. The row of balls are less dependent than the row of rollers on an efficient supply of lubricant for performing its function.

In order to make possible an axial adjustment of the rotatable element, which is arranged in the bearing and which in the embodiment shown is constituted by the gear pinion 2, a bearing race ring 5 is provided with a threaded portion on its envelope surface. The threads cooperate with corresponding threads in a portion 12 in the housing 1 adjacent the bearing. By turning the race ring 5 this race ring is displaced axially in the housing 1, whereby the gear wheel 2 can be adjusted to a desired teeth mesh with the gear wheel 11. In order to make possible a turning of the race ring 5 this is preferably provided with a number of apertures 13 at its outer side surface, in which apertures corresponding projections of a turning tool can engage. When the race ring 5 has been turned so that the gear wheel 2 has reached the desired position the race ring 5 is locked against further turning by tightening a locking nut 14, which is arranged on the threads of the race ring 5 and which engages an end surface of the housing 1.

In the embodiment of FIG. 2, the bearing comprises outer race ring 15, inner race ring 16 and two rows of rolling bodies 17, 18 arranged therebetween. One of the rows of rolling bodies 17 comprises rollers, the axes of which are inclined at an angle against the bearing axis and which roll against race tracks arranged at an angle relative to the bearing axis, whereas the second row of rolling bodies 18 comprises balls which roll against race tracks which give angular contact to the balls. The inner race ring 16 can be divided into two rings 19, 20 with a race track formed in each race ring.

The outer race ring 15 is provided with a radial flange 21 equipped with a number of through-holes 22 for fixing screws or the like, whereby the ring 15 can be fixed with axial screw joints to a radial surface arranged on an adjacent element for engagement against the flange 21. Spacing washers can preferably be provided between the flange and the end surface in order to make possible an accurate axial positioning of the bearing.

The fixing of the bearing with a number of axial screws, simplifies the mounting and dismounting of the bearing, and the fact that the bearing can have radial as well as axial surfaces engaging the adjacent element entails that it will be rigidly fixed. The flange furthermore will effect that the outer race ring is reinforced, which is a further advantage in a bearing intended for taking up bending moments.

Sometimes it can be preferable that also the inner race ring, particularly when made in one single piece, is provided with a flange corresponding to the flange 21. This further flange can be arranged at the same side of the bearing as the flange 21 or at the opposite end and it can be directed either outwards or inwards. It is also possible that the inner race ring only is provided with a flange. The flange does not have to be provided at one end of the ring but it can be located at a position between the ends of the race ring. As the end of the bearing where the rollers 3 are arranged is intended to be subjected to the largest loads and usually is arranged outermost in the bearing seat it is suitable that the flange is arranged at this end of the bearing. One or more of the race tracks for the rolling bodies can if desired be arranged directly in the adjacent element, e.g. a shaft journal.

Embodiments other than that described hereabove are possible within the scope of the appended claims. It is for instance not necessary that the inner race ring of the bearing is divided and that the outer race ring is made in one piece. It is also possible to arrange threads on the inner race ring and on the element surrounded by the inner race ring in connection to the seat for the inner race ring instead of at the outer race ring and in connection to this. The rollers 8 can also be made cylindrical and adapted to roll against taper race tracks. The generatrices of the rollers and/or the race tracks can also be curved. The bearing portion with the balls 9 can also be designed as a deep groove ball bearing with ability of taking up axial loads in both directions.

I claim:

1. The combination comprising a housing, a shaft journal having a gear wheel at one end, a bearing assembly rotatably supporting the shaft journal in a cylindrical seat in said housing including a one-piece outer ring having threads on its outer periphery cooperating with threads in said cylindrical seat, means for rotating said outer ring to permit axial adjusting movement of said bearing assembly relative to said housing, an inner race ring on said shaft journal for each of said rows of rolling bodies, two rows of rolling bodies in the annular space between said rings spaced closely relative to one another, one of said rows comprising rollers having axes inclined at an angle to the bearing axis disposed adjacent said gear wheel, the other row of rolling bodies comprising balls which roll against raceways in the ring to provide angular contact disposed at the opposite end of the said shaft journal and a locking member engaging the threads of said outer ring to permit axial adjustment thereof relative to said housing and abutting said housing to lock said outer ring in a predetermined axial position in said housing.

* * * * *